(No Model.)
J. B. TAYLOR.
VERTICALLY ADJUSTABLE GATE.
No. 461,121. Patented Oct. 13, 1891.
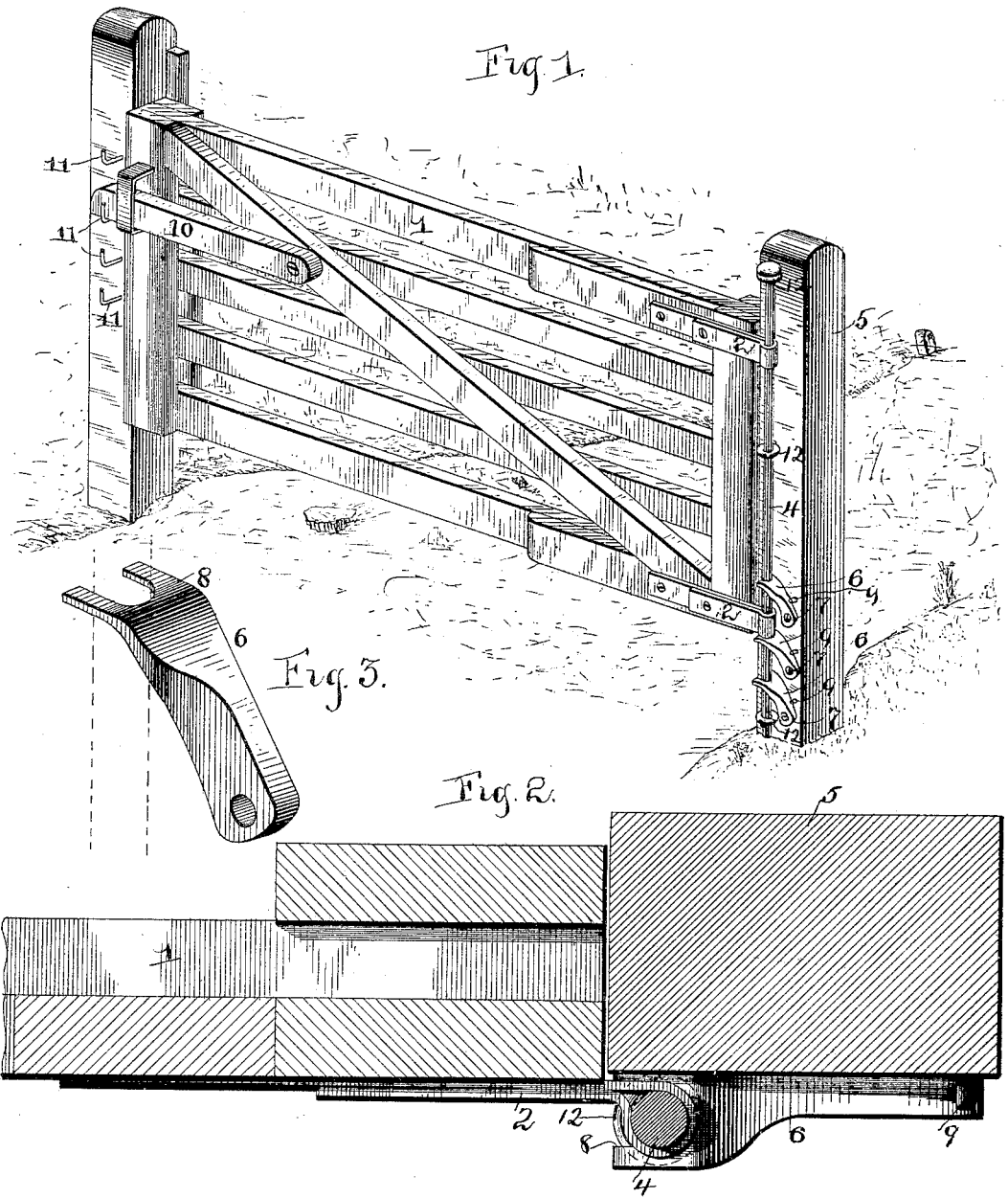
Witnesses
Inventor
John B. Taylor,
By his Attorneys,

UNITED STATES PATENT OFFICE.

JOHN B. TAYLOR, OF PALMYRA, MISSOURI.

VERTICALLY-ADJUSTABLE GATE.

SPECIFICATION forming part of Letters Patent No. 461,121, dated October 13, 1891.

Application filed March 13, 1891. Serial No. 384,901. (No model.)

*To all whom it may concern:*

Be it known that I, JOHN B. TAYLOR, a citizen of the United States, residing at Palmyra, in the county of Marion and State of Missouri, have invented a new and useful Vertically-Adjustable Gate, of which the following is a specification.

The invention relates to improvements in vertically-adjustable gates.

The object of the present invention is to simplify and improve the construction of vertically-adjustable gates, to enable them to be securely retained at the desired elevation, and to provide efficient means for locking the gate at different heights.

The invention consists in the construction and novel combination and arrangement of parts, hereinafter fully described, illustrated in the accompanying drawings, and pointed out in the claim hereto appended.

In the drawings, Figure 1 is a perspective view of a gate embodying the invention. Fig. 2 is a horizontal sectional view. Fig. 3 is a detail perspective view of one of the pawls.

Referring to the accompanying drawings, 1 designates a gate constructed of horizontal rails, vertical end bars arranged on opposite side of the rails, and an inclined brace extending from the bottom of the inner end to the top of the outer end. The inner end of the gate has secured to it hinge-leaves 2, which have their eyes arranged on a vertically-disposed rod 4, secured to a hinged post 5, on which the gate may be adjusted to permit the passage of small animals and to clear snow, and it is secured in its vertical adjustment by a series of pawls 6, perforated at one end and pivoted by screws 7 to the hinged post 5 and at their free ends provided with curved recesses 8, which receive the rod 4 and project beyond the same and are adapted to support the lower hinge-leaf, and, being engaged by the same, to hold the gate elevated, and the pawls are prevented swinging backward beyond a vertical position by a series of projections 9, which form stops which limit the swing of the pawls. The stops permit the pawls to be swung back a sufficient distance to allow the lower hinge-leaf to pass them, and after being released the pawls will swing back upon the rod.

The free end of the gate is provided with a pivoted latch-bar 10, which is adapted to engage keepers 11, and the latter are L-shaped and are arranged at intervals on the latch-post and are adapted to be engaged by the latch when the gate is in an elevated position.

It will be seen that the gate is provided with simple and inexpensive means for securing it at different elevations and for latching it when raised.

The rod 4 is arranged in eyes of eyebolts 12 and is provided at its upper end with a head, and its lower end is perforated and is adapted for the reception of a transverse pin, which prevents the withdrawal of the rod from the eyebolt.

What I claim is—

The combination of a hinge-post, the vertical rod secured thereto, a gate hinged to the rod and vertically movable on the same, the pawls pivoted to the post and provided at their free ends with recesses to receive the rod and projecting on opposite sides of the same and engaging the lower end of the gate, said pawls being arranged in a vertical series, whereby the gate is supported in its adjustment, and the stops holding the pawls against the rod, substantially as described.

In testimony that I claim the foregoing as my own I have hereto affixed my signature in presence of two witnesses.

JOHN B. TAYLOR.

Witnesses:
 A. E. M. ELY,
 E. R. YEAGER.